UNITED STATES PATENT OFFICE.

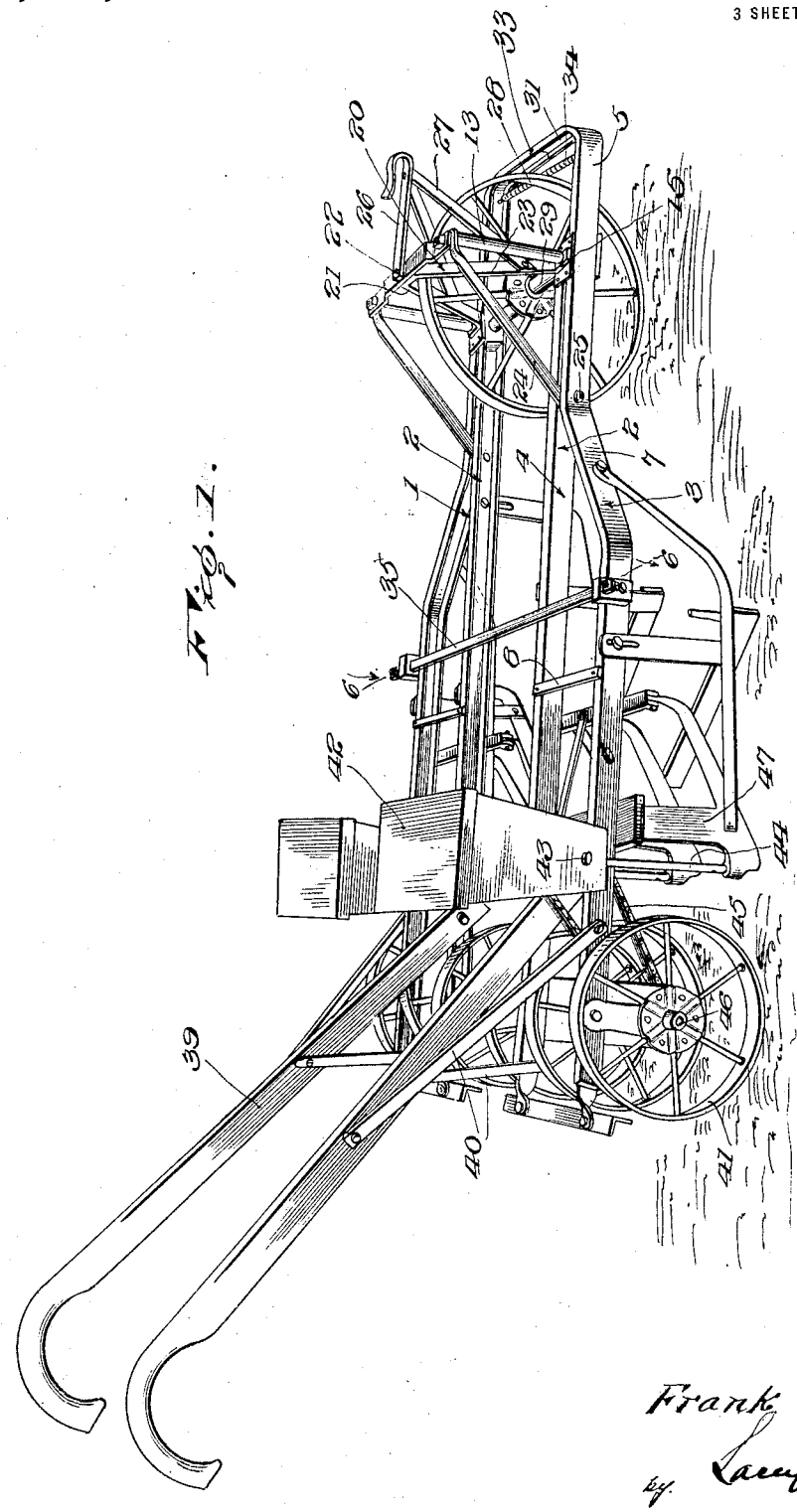

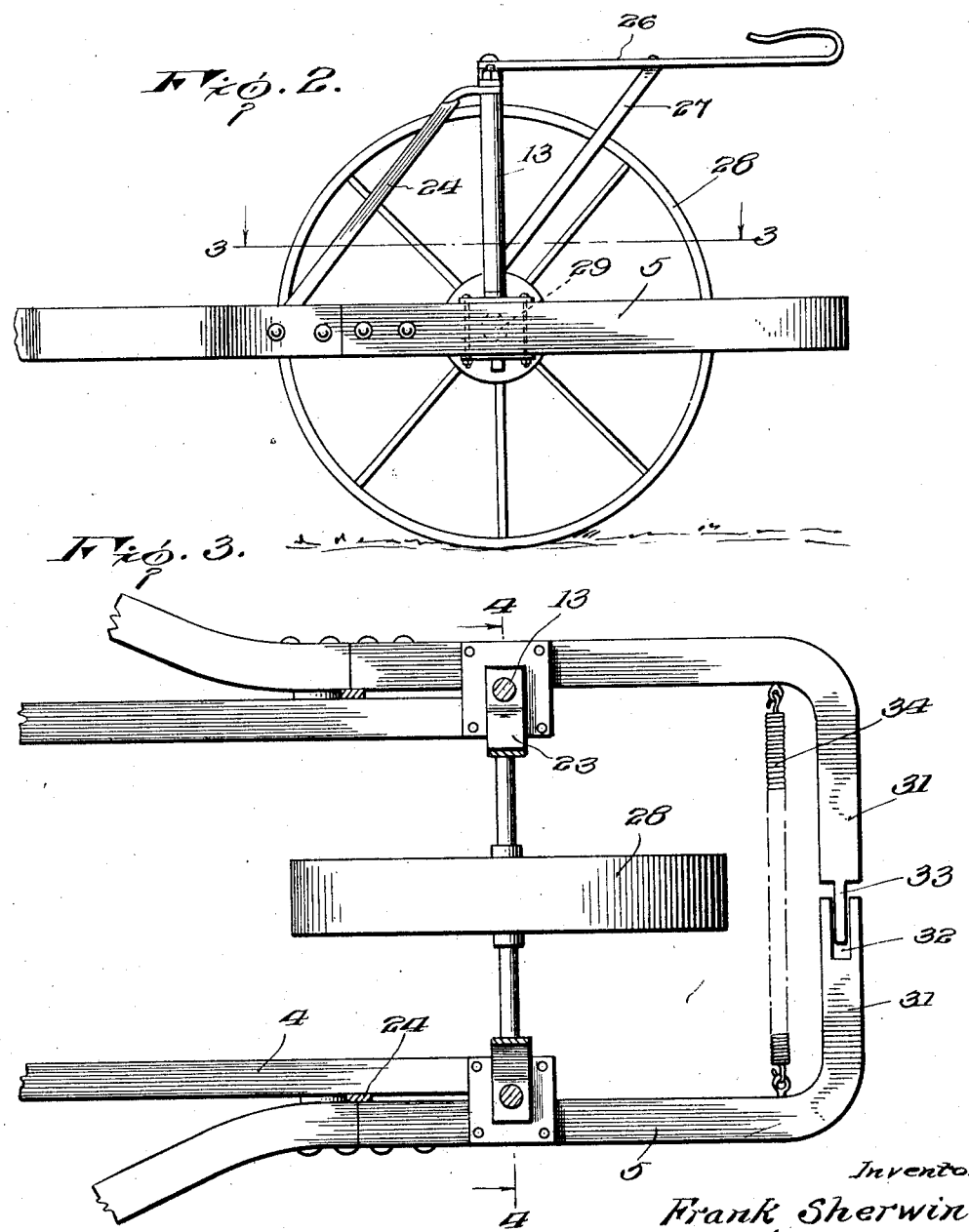

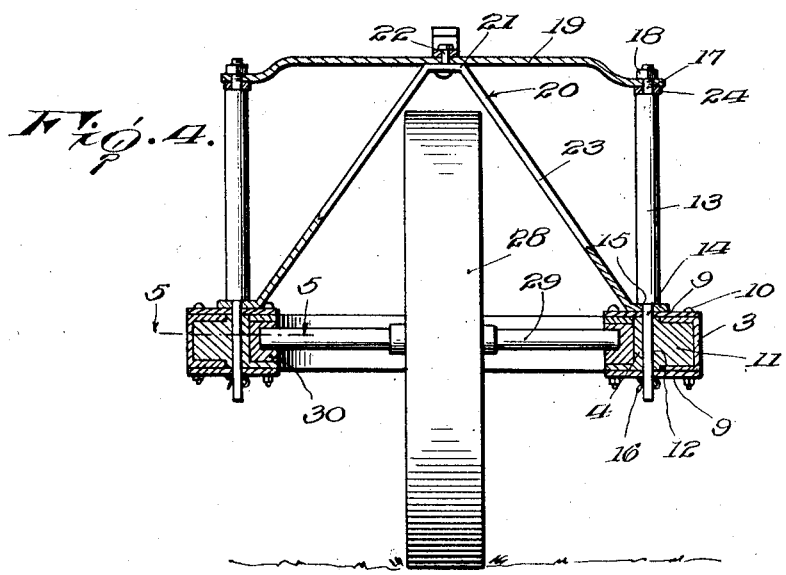
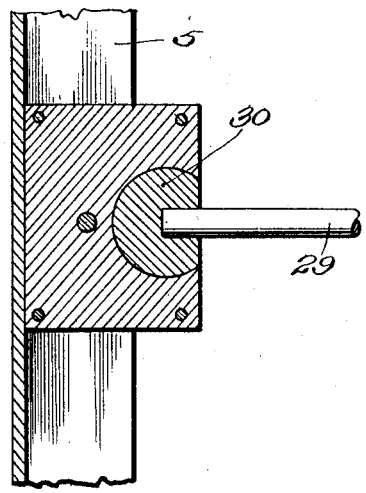
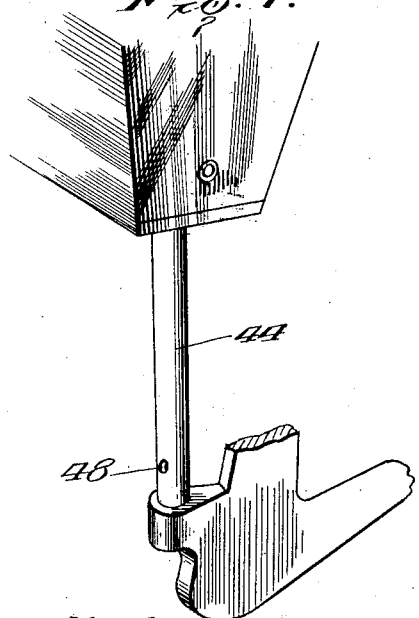
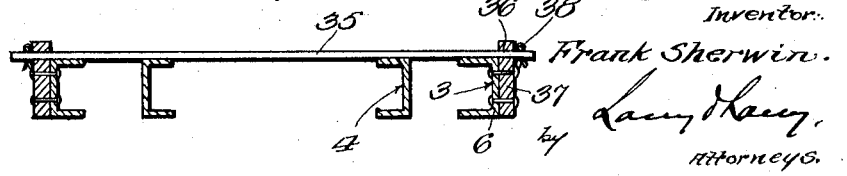

FRANK SHERWIN, OF BROOKINGS, SOUTH DAKOTA.

SEED-DRILL.

1,352,482.   Specification of Letters Patent.   Patented Sept. 14, 1920.

Application filed October 2, 1919. Serial No. 327,859.

*To all whom it may concern:*

Be it known that I, FRANK SHERWIN, a citizen of the United States, residing at Brookings, in the county of Brookings and State of South Dakota, have invented certain new and useful Improvements in Seed-Drills, of which the following is a specification.

This invention relates to improvements in seed drills for seeding alfalfa, clover, and all small seeds and also for seeding wheat, rye, and other coarse grain, and the invention is designed more particularly as an improvement upon the structure shown in my patent issued May 2, 1916, No. 1,181,930. In the patented structure the two seed boxes of the drill are mounted upon a relatively rigid frame, and the worm shaft for feeding the seed to the boots of the machine extends between the seed boxes so that there can be no independent movement of the two sets of planting mechanisms. One of the primary objects of the present invention is to so construct the frame of the machine and the seeding devices that each of said devices may have movement independently of the other and may therefore automatically adapt itself to unevenness in the ground surface caused by the presence of dead furrows, back furrows, etc. In this connection the invention has as its object to divide the frame of the machine into two lateral sections which may have movement independently of each other in an up and down direction in traveling over inequalities in the ground surface so that when one of the seeding devices travels over an elevation, the other seeding device will not be elevated or otherwise displaced from planting or seeding relation to the ground surface.

Another equally important object of the invention is to so connect and construct the side sections of the frame of the machine that these sections may be relatively laterally spread apart or brought together so as to enable the operator of the drill to control the course of travel of each section independently of the other, which is of great advantage in seeding between rows of standing corn.

A further object of the invention is to provide means for restraining the sections of the frame from lateral tilting movement when passing over inequalities in the ground surface or when being spread apart or moved together by the manipulation of the handles which are associated with the side sections of the frame.

In the accompanying drawings:

Figure 1 is a perspective view of the seed drill embodying the present invention;

Fig. 2 is a detail side elevation of the forward portion of the machine;

Fig. 3 is a horizontal sectional view on the line 3—3 of Fig. 2;

Fig. 4 is a vertical transverse sectional view on the line 4—4 of Fig. 3;

Fig. 5 is a detail horizontal sectional view on the line 5—5 of Fig. 4;

Fig. 6 is a vertical transverse sectional view taken substantially on the line 6—6 of Fig. 1 looking in a downward direction;

Fig. 7 is a perspective view of a portion of one of the seeding devices.

The frame of the machine is indicated in general by the numeral 1 and as previously stated the same comprises two lateral sections which are so assembled and connected that they may have movement independent of each other as will presently be more specifically pointed out. Each of these sections is indicated in general by the numeral 2 and each comprises an outer side beam 3 and an inner side beam 4. These beams are preferably of channel formation and each beam 3 comprises front and rear portions 5 and 6, respectively, which are parallel, the former being, however, located in advance of the latter and connected thereto by a diagonal intermediate portion 7. The inner beam 4 of each frame section is connected as will be presently described, to the forward portion 5 of the respective beam 3 and to the said portion 6 thereof, this latter connection between the beams being effected by means of cross bars 8 or any other suitable connecting or bracing means. The seed boxes and also certain other elements of the seeding mechanism also serve this purpose. In connecting the forward ends of the beams 4 with the forward portions 5 of the respective beams 3, plates 9 may be bolted or otherwise secured as at 10 to the upper and under sides of the said beams, and if desired a bearing block 11 may be arranged between the beams as shown in Fig. 4 of the drawings and this block is provided with a vertically extending socket which is indicated by the numeral 12.

Standards 13 are provided with reduced lower end portions 14 the formation of which results in shoulders 15, and the reduced portions of these standards are fitted loosely in the sockets 12, and cotter pins 16 are fitted through the lower ends of the said reduced portions and by engagement against the corresponding lower plates 9 serve to prevent upward displacement of the standard. At their upper ends, the standards are reduced to provide stud portions 17 which are threaded for the application thereto of nuts 18, and a bridge piece 19 is disposed to extend between the said upper ends of the standards and at its ends is fitted to the stud portions 17 and secured in place by the nuts 18. In this manner the upper ends of the standards are relatively braced, and an additional bracing means resides in a yoke 20 having an intermediate portion 21 which is riveted or otherwise secured as at 22 to the under side of the bridge piece 19, and downwardly diverging side portions 23 which bear at their lower ends upon the upper plates 9 and which receive the reduced portions 14 of the standards 13 and are engaged by the shoulders 15, as clearly shown in Fig. 4. The standards 13 are further braced with relation to their respective frame sections by means of diagonal braces 24 which are secured at their upper ends to the stud portions 17 of the standards and at their lower ends by means of bolts or other fastening devices 25 between the forward portions of the beams 3 and 4 of the respective side frame section.
A draft hook or clevis 26 is connected by means of the bolt or rivet 22 with the intermediate portion of the bridge piece 19 and extends forwardly therefrom and is supported at its forward end and braced by means of diagonal braces 27 secured at their upper ends to the said draft hook or clevis and at their lower ends to the portions 23 of the yoke 20.

In order to support the forward end of the machine for travel over the ground surface, a ground wheel 28 is provided and is mounted upon an axle 29 which is mounted at its ends in bearing members 30 which may be mounted for oscillatory movement in the blocks 11 as clearly shown in Figs. 4 and 5 of the drawings, this method of mounting the ends of the axle permitting of lateral swinging of the frame sections without interfering with the free rotation of the said axle and wheel.

The beams 3 have the forward ends of their portions 5 turned inwardly laterally toward each other as indicated by the numeral 31 and in order to prevent the frame sections becoming displaced in a forward or rear direction with relation to each other and yet permit of the sections being spread apart or brought toward each other, the portion 31 of one of the beams 3 is formed with a recess 32, and the corresponding portion of the other beam 3 is formed with a tongue 33 which extends loosely into the said recess.

A spring 34 is connected at its ends with the portions 5 of the beams 3 and extends in front of the ground wheel 28 and yieldably pulls the forward portions of the frame sections toward each other thus tending to relatively spread their rear portions. The separation of the rear portion of the frame sections is limited, however, by means which will now be described. A bar 35 is disposed to extend transversely of the upper side of the frame of the machine and in engagement with the upper sides of the portions 6 of the beams 3 and the opposing portions of the beams 4, as clearly shown in Figs. 1 and 6 of the drawings, and this bar is slidably fitted at its ends through slots 36 formed in brackets 37 which are secured upon the outer sides of the said portions 6 of the beams 3, cotter pins 38 being passed through openings in the outer ends of the said bar 35 and engaging against the outer faces of the respective brackets 37 for the purpose stated. While the bar 35 and its associated parts serve to limit the spreading or separating movement of the sections of the frame with relation to each other, it does not in any way interfere with movement of the frame sections inwardly toward each other and this may be accomplished to a greater or less degree while the machine is being drawn over the field, such adjustment of the frame sections being effected through the medium of the handles of the machine which are indicated in general by the numeral 39 and which are secured at their lower ends at any convenient points each to a respective one of the frame sections, and which are braced by means of suitable brace bars 40 connected with them and with the beams of the respective frame section. Each frame section is supported independently by a set of ground wheels 41 and each frame section in turn supports a seed box 42 in which operates a shaft 43 constructed, as in my prior patent, to feed the seed from the box into the seed tubes of the seed boots which tubes are indicated by the numeral 44, the shaft 43 of each seed box being driven by means of any suitable gearing 45 in turn driven from the axles 46 upon which the wheels 41 are mounted. The shafts 46 are, as will be readily understood, independent of each other and each mounted in its respective frame section, the shaft 43 of the seed boxes being likewise independent as also the driving gear connections between each shaft 46 and its respective shaft 43. The runners of the seed boots are indicated by the numeral 47 and are supported in any convenient manner beneath the respective frame sections. In order that clogging or other stoppage of the lower ends of the seed tubes 44 may be made apparent to the operator of the machine, it is preferable that the said tubes 44 be provided each near its lower end and at its rear side with an opening 48 through which the seed will be visible in the event the discharge end of the said tubes 44 becomes clogged and the seed accumulate in the said tube 44.

From the foregoing it will be understood that due to the fact that the bar 35 rests flat upon the upper sides of the beams 3 and 4, the frame sections of the machine will be effectually prevented from tilting laterally, and will on the other hand be securely held in upright position. However, the bar does not in any way interfere with the frame sections being adjusted toward or from each other and, when the handles are not being manipulated for this purpose or held in a definite position to otherwise relatively space the frame sections, the sections will stand apart to the extent that their outward movement will be limited by the engagement of the brackets 37 against the cotter pins 38, they being influenced in such movement by the spring 34 as previously explained. It will also be understood that due to the fact that the lower portions 14 of the standards 13 fit loosely in the openings 12, the frame sections may be independently tilted upwardly at their rear ends and may therefore readily pass over inequalities in the ground surface without the movement of one section interfering with or influencing the movement of the other section.

Having thus described the invention, what is claimed as new is:

1. In a seed drill, a frame comprising sections connected at their forward portions in a manner to permit of lateral swinging movement of their rear portions toward and from each other, means yieldably acting upon the sections to move their rear portions apart, means whereby the rear portions of the sections may be moved toward each other, and a seeding means mounted upon each section.

2. In a seed drill, a frame comprising sections connected at their forward portions in a manner to permit of lateral swinging movement of their rear portions toward and from each other, means yieldably acting upon the sections to move their rear portions apart, means whereby the rear portions of the sections may be moved toward each other, a seeding means mounted upon each section, and means for limiting the movement of the rear portions of the sections away from each other.

3. In a seed drill, a frame comprising sections connected at their forward portions in a manner to permit of lateral swinging movement of their rear portions toward and from each other, means yieldably acting upon the sections to move their rear portions apart, means whereby the rear portions of the sections may be moved toward each other, a seeding means mounted upon each section, and means for limiting the movement of the rear portions of the sections away from each other, the said means comprising members mounted upon the said sections, a bar slidably fitted at its ends through the said members, and means upon the bar for engagement with the members in the outward movement of the frame sections.

4. In a seed drill, a frame comprising sections connected at their forward portions in a manner to permit of lateral swinging movement of their rear portions toward and from each other, means yieldably acting upon the sections to move their rear portions apart, means whereby the rear portions of the sections may be moved toward each other, a seeding means mounted upon each section, and means for limiting the movement of the rear portions of the sections away from each other, the said means comprising members mounted upon the said sections, a bar slidably fitted at its ends through the said members, and means upon the bar for engagement with the members in the outward movement of the frame sections, the said bar engaging the upper sides of the frame sections whereby to prevent lateral tilting of either section.

5. In a seed drill, a frame comprising sections having their forward portions connected in a manner to permit of lateral movement of the rear portions of the sections toward and from each other, the forward portions of the sections having coacting means to prevent longitudinal displacement of the sections with relation to each other, means whereby the sections may be laterally adjusted at their rear portions, and a seeding means mounted upon each section.

6. In a seed drill, a frame comprising lateral sections, standards mounted at the forward portions of the sections and connected therewith in a manner to permit of lateral swinging movement of the sections with relation to each other, bearings upon the frame sections adjacent the lower ends of the standards, an axle journaled at its ends in the said bearings and carrying a ground wheel, and a seeding means mounted upon each section.

In testimony whereof I affix my signature.

FRANK SHERWIN. [L. S.]